Nov. 17, 1942.   H. A. REICH   2,302,573
SKIRT MEASURING AND MARKING DEVICE
Filed Dec. 1, 1941   2 Sheets-Sheet 2
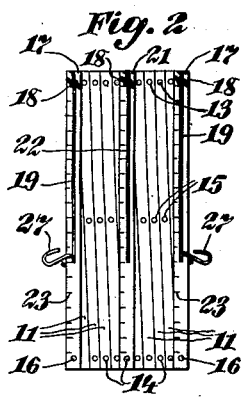
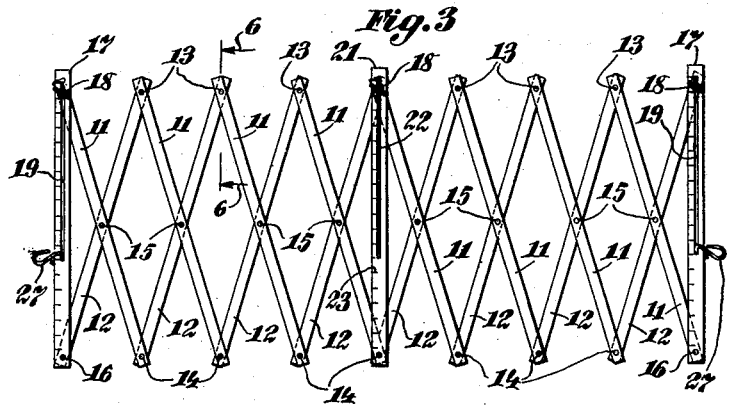
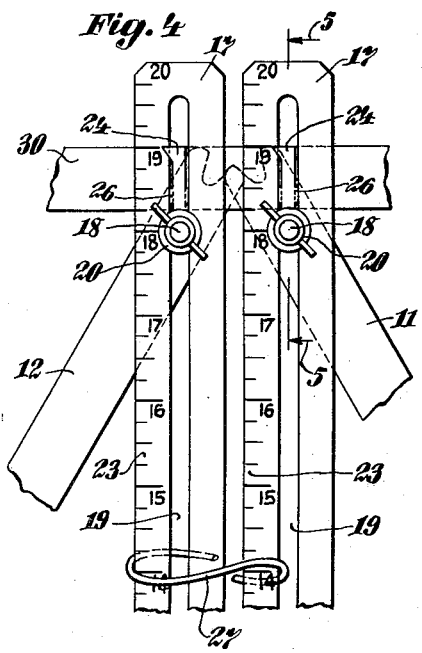
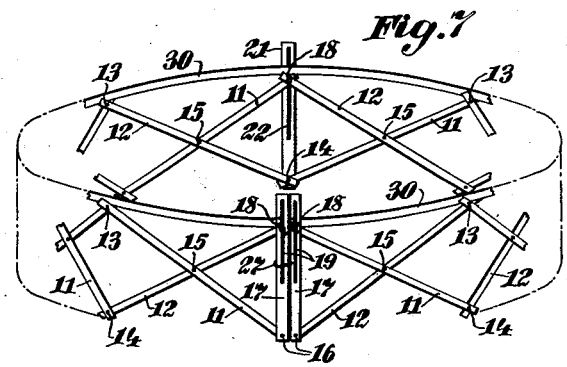
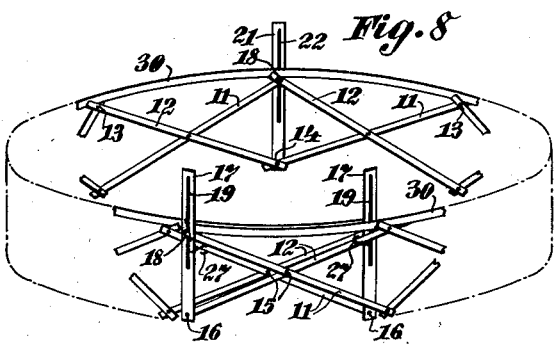
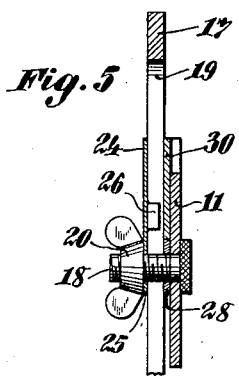
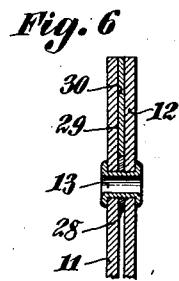
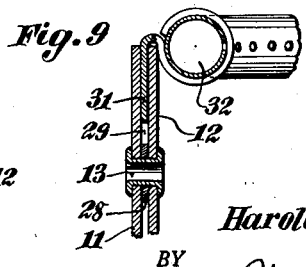
INVENTOR.
Harold A. Reich,
BY
ATTORNEY.

Patented Nov. 17, 1942

2,302,573

UNITED STATES PATENT OFFICE 2,302,573

SKIRT MEASURING AND MARKING DEVICE

Harold A. Reich, New York, N. Y.

Application December 1, 1941, Serial No. 421,142

2 Claims. (Cl. 33—9)

The invention here disclosed relates to devices for measuring and marking skirts desired heights from the floor.

Objects of the invention are to provide a device of this nature, which when not in use, can be folded to small dimensions, which can be quickly set up and adjusted to the desired height and which then in the position of use, will be completely self-sustaining and substantial in character to afford practical and efficient means for measuring or marking the skirt and which further will be of a character readily manufactured and inexpensive as to cost.

Other objects and the novel features by which all purposes of the invention are attained will appear and are set forth in the following specification.

The drawings accompanying and forming part of the specification illustrate present preferred forms of the invention, but structure may be further modified and changed with respect to the present disclosure, all within the true intent and broad scope of the invention as hereinafter defined and claimed.

Fig. 2 is a side elevation showing the device fully collapsed.

Fig. 3 is a side view showing the latticework structure extended as for adjusting it to a desired height.

Fig. 4 is an enlarged broken detail illustrating particularly features for measuring the height and for securing the ends of the latticework wall together.

Figure 1:
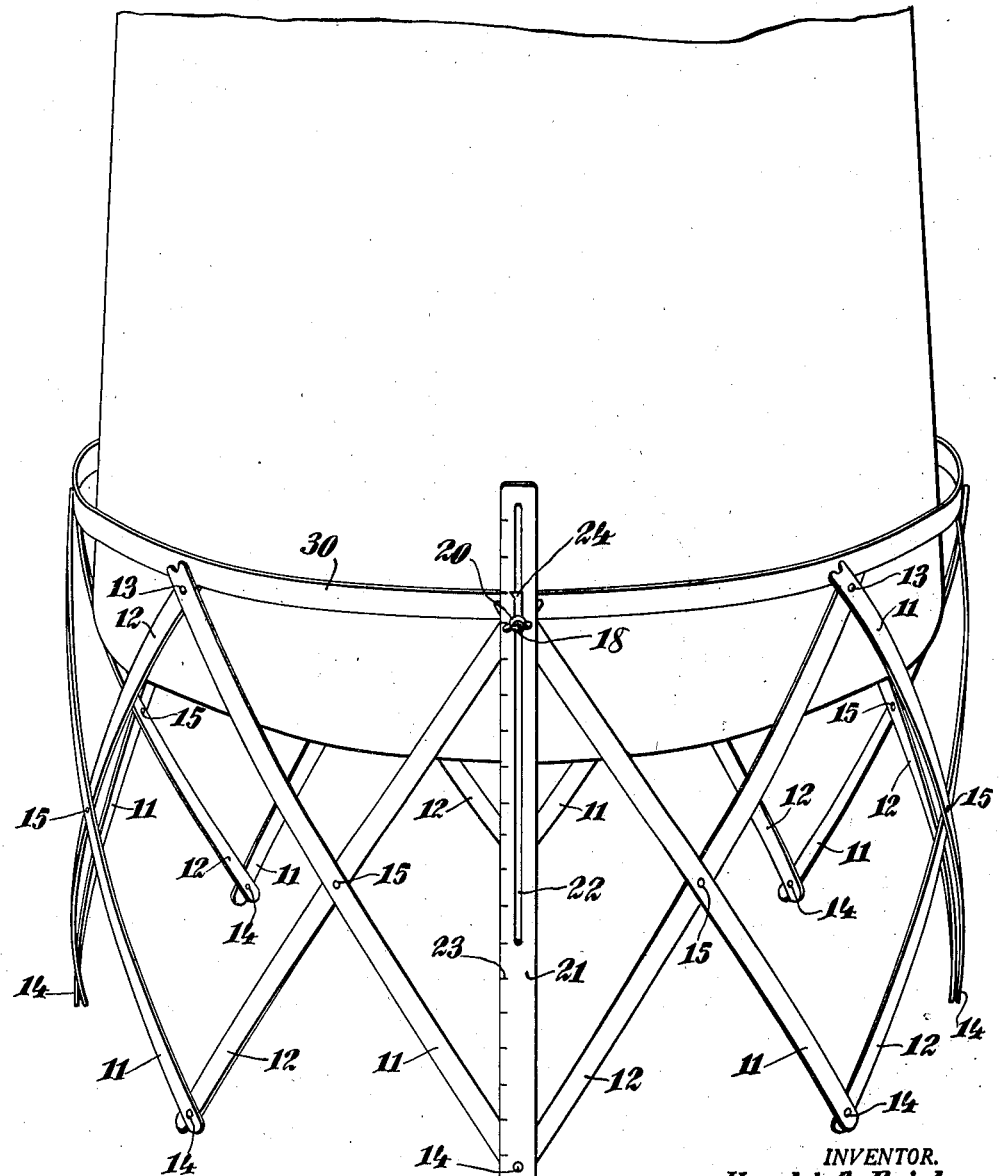
Fig. 1 is a general view illustrating the device set up and in use.

Figs. 5 and 6 are broken sectional views as on lines 5—5 of Fig. 4 and 6—6 of Fig. 3 respectively.

Figs. 7 and 8 are broken perspective details illustrating setting of the marker to different heights and in the second instance, overlapping the ends to keep the circular outline to the same circumference.

Fig. 9 is a broken sectional detail showing a perforated tube construction used for actual marking purposes.

In the general view, Fig. 1, the device is shown as consisting of a substantially circular gage wall 10, adapted to be set up in self-sustaining relation on the floor, about the skirt, either on a form or on the person, to be measured or marked.

Vertical adjustability for height and longitudinal adjustability for circumference are attained by constructing this gage in extensible latticework form of two sets of angularly related bars or slats 11 and 12, pivotally connected at their upper and lower ends at 13, 14, and pivotally connected where they cross at the center at 15.

The end bars are shown pivotally connected at the lower ends at 16, with upright end posts or bars 17, and as slidingly and pivotally connected at the upper ends with said same uprights 17, by clamp bolts 18, slidable in vertical slots 19, and held by wing nuts 20.

Also there is provided in the illustration an intermediate upright 21, pivotally engaged at its lower end on one of the lattice bar pivot studs 14, and slotted at 22, for the clamp bolt and wing nut 18, 20, provided at that point as a substitute for one of the lattice bar upper pivots 13.

The described construction can be collapsed compactly as shown in Fig. 2, or be easily extended as in Fig. 3. With such extension, the overall height of the angled lattice bar proportionately reduces, while the uprights retain their upright position and of course, full height. As a consequence, the uprights can be utilized as a standard by which to indicate actual height of the extensible and contractible portion of the device.

To facilitate such indication and measurement, the uprights are shown as carrying scales 23, and the vertically adjustable structure as carrying pointers 24, registerable on said scales.

In the illustration, the pointers 24, are carried by or form part of the washers 25, engaged on the upper pivot bolts and caught under the wing nuts 20, said pointer extensions shown as having side lugs 26, bent down to ride in the slots 22.

Suitable means are preferably provided for coupling the end uprights 17, together to retain the gage in the circular self-standing relation shown in Figs. 1, 7 and 8, for example, links 27 each slidably engaged in a slot 22, of one upright and adapted to be hooked about the other upright, shown particularly in Fig. 4.

If the ends of the gage are overlapped as shown in Fig. 8, these hooks may be caught about the latticework structure to sustain the device in the circular upstanding relation.

To assure free pivotal action, washers such as shown at 28, Figs. 6 and 9, may be interposed at the pivots, between the slats. These washers provide narrow spaces 29, between the upper ends of the slats to receive a straightedge or other marking or measuring device. Figs. 4 to 8 show a straightedge in the form of a flexible tape 30, inserted in this space and in that relation registering with the measuring pointers 24, Figs. 4 and 5.

Fig. 9 shows a tape or thin bracket structure 31, inserted in the slots 29, between the tops of the slats and supporting a perforated tubular ring or ring segment 32, for effecting marking of the skirt with powdered chalk, talcum or other marking medium.

It is contemplated that other gaging or marking means may be employed, as for example, elastic cord supported in the slots 29, and which when properly chalked can be "snapped" in the gaps between the upper ends of the slats to impress any desired number of chalk lines about the skirt.

The wing nut pivot connections provide practical and convenient means for clamping and securing the gage in any desired longitudinally extended and vertically adjusted relation, but it is contemplated that other forms of clamp devices may be employed. Also various means may be used for attaching the ends of the gage together or holding them in the overlapped relation, Fig. 8, to retain the device in firm self-sustaining circular formation.

When not in use, the device may be collapsed and stored away in the compact folded form shown in Fig. 2.

When the clamps are loose, the device can be freely stretched out as in Fig. 3. In such longitudinal extension, the vertical height of the lattice formation is reduced and when the height desired is indicated on scales 23, the clamps can be secured and the device set up on-edge and the uprights brought together to connect the structure in circular formation. In this condition, the gage is fully self-sustaining and forms a firm sort of wall which can be used direct as a means for indicating skirt length, or for example, as an aid for inserting pins, making stitches or marks on the skirt, etc.

If a straight edge is desired, as for drawing a continuous line, the flexible tape 30, or other medium may be inserted in the holding slots at the upper ends of the lattice. If a circular marking tool, such as indicated in Fig. 9, is used, a bulb or similar device may be attached for forcing the marking powder out through the perforations.

The device may be made in different materials, such as wood, metal, Celluloid, cardboard, plastics, or the like, and the shape of the bars or slats may vary, though the flat form indicated is at present preferred, because this combines a desirable degree of stiffness and strength with flexibility for conforming to the substantially circular outline.

The end uprights 17, 17, may be omitted and the lattice strips at the ends of the structure be directly connected together. Also the lattice construction may be simplified as by eliminating the crossing of the bars at intermediate points and omitting any intermediate pivots such as 15. Other variations may be made coming within the true scope of the invention and terms employed herein are to be construed accordingly.

What is claimed is:

1. A skirt measuring and marking device, comprising angularly related bars pivotally connected in lattice formation and variable in transverse width with longitudinally extensive and contractive movements of the same, means for indicating transverse dimensions of said latticework structure, means for securing said structure in desired positions of transverse extent and means for removably securing end portions of the adjustable structure together in circular self-sustaining relation, said lattice bars having narrow spaces between the upper ends of the same and a flexible straightedge removably insertable in said spaces.

2. A skirt measuring and marking device, comprising a series of angularly related bars pivotally connected at their upper ends in extensible and contractible lattice formation, said lattice formation being sufficiently flexible to permit bringing of the ends of the same together into a complete circle, means at the ends of said lattice formation for temporarily securing end portions of the same together in such circular arrangement and the bars of said lattice formation having the requisite strength to form an upright self-sustaining substantially circular wall when said end portions of the lattice formation are so connected together, means for indicating the skirt length measurements provided by the upper pivotally connected ends of the lattice bars in various positions of adjustment of the extensible and contractible lattice formation, means for temporarily securing the lattice bars with the upper pivotally connected ends at various skirt length positions and a circularly extensible flexible skirt marking member removably and slidably supported on the upper pivotally connected ends of said lattice bars.

HAROLD A. REICH.